[19] United States Patent
Singh

(10) Patent No.: US 11,789,532 B1
(45) Date of Patent: *Oct. 17, 2023

(54) SYSTEM AND METHOD FOR NAVIGATING ON AN AUGMENTED REALITY DISPLAY

(71) Applicant: Bank of America Corporation, Charlotte, NC (US)

(72) Inventor: Shailendra Singh, Maharashtra (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/153,975

(22) Filed: Jan. 12, 2023

Related U.S. Application Data

(63) Continuation of application No. 17/747,568, filed on May 18, 2022, now Pat. No. 11,586,286.

(51) Int. Cl.
  *G06F 3/01* (2006.01)
  *G02B 27/01* (2006.01)
  *G02B 27/00* (2006.01)
  *G06T 19/00* (2011.01)

(52) U.S. Cl.
  CPC ......... *G06F 3/013* (2013.01); *G02B 27/0093* (2013.01); *G02B 27/0101* (2013.01); *G02B 27/017* (2013.01); *G02B 27/0179* (2013.01); *G06F 3/012* (2013.01); *G06T 19/006* (2013.01); *G02B 2027/014* (2013.01); *G02B 2027/0138* (2013.01); *G02B 2027/0187* (2013.01)

(58) Field of Classification Search
  CPC ..... G06F 3/013; G06F 3/012; G02B 27/0093; G02B 27/0101; G02B 27/017; G02B 27/0179; G02B 2027/0138; G02B 2027/014; G02B 2027/0187; G06T 19/006

See application file for complete search history.

(56) References Cited

U.S. PATENT DOCUMENTS

| | | | |
|---|---|---|---|
| 5,815,411 | A | 9/1998 | Ellenby et al. |
| 6,064,398 | A | 5/2000 | Ellenby et al. |
| 7,301,536 | B2 | 11/2007 | Ellenby et al. |
| 7,301,648 | B2 | 11/2007 | Foxlin |
| 7,511,736 | B2 | 3/2009 | Benton |
| 7,693,702 | B1 | 4/2010 | Kerner et al. |
| 7,702,454 | B2 | 4/2010 | Nesbitt |
| 7,737,965 | B2 | 6/2010 | Alter et al. |
| 8,094,091 | B2 | 1/2012 | Noma |
| 8,102,334 | B2 | 1/2012 | Brown et al. |

(Continued)

*Primary Examiner* — Dmitriy Bolotin

(57) ABSTRACT

A system receives, from an augmented reality device, a first image of a web application, where the first image shows a first element of the web application. The system receives eye tracking information that indicates eye movements of a user as the user is looking at different elements of the web application. The system determines that the user is looking at a first location coordinate on the first image of the web application. The system determines that the first element is located at the first location coordinate. The system identifies first element attributes associated with the first element. The system generates an augmented reality message comprising the first element attributes. The system generates an augmented reality display in which the augmented reality message is presented as a virtual object. The system transmits the augmented reality display to the augmented reality device.

20 Claims, 5 Drawing Sheets

(56) References Cited

U.S. PATENT DOCUMENTS

| | | |
|---|---|---|
| 8,817,017 B2 | 8/2014 | Vaganov |
| 8,854,282 B1 | 10/2014 | Wong |
| 8,907,983 B2 | 12/2014 | Mcardle et al. |
| 8,953,242 B2 | 2/2015 | Larson et al. |
| 9,077,973 B2 | 7/2015 | Aguren |
| 9,171,214 B2 | 10/2015 | Ben Tzvi |
| 9,210,413 B2 | 12/2015 | Grinberg et al. |
| 9,244,281 B1 | 1/2016 | Zimmerman et al. |
| 9,482,540 B2 | 11/2016 | Shen |
| 9,568,995 B1 | 2/2017 | Lian |
| 9,569,893 B2 | 2/2017 | Dominici et al. |
| 9,581,820 B2 | 2/2017 | Robbins |
| 9,678,349 B2 | 6/2017 | Yang |
| 9,766,075 B2 | 9/2017 | Foxlin |
| 9,766,465 B1 | 9/2017 | Tiana et al. |
| 9,803,993 B2 | 10/2017 | Nguyen Kim et al. |
| 9,824,499 B2 | 11/2017 | Wright et al. |
| 9,928,569 B2 | 3/2018 | Bean et al. |
| 9,928,653 B2 | 3/2018 | Atsmon |
| 9,934,614 B2 | 4/2018 | Zhang et al. |
| 9,952,665 B2 | 4/2018 | Di Censo et al. |
| 10,043,318 B2 | 8/2018 | Khan et al. |
| 10,108,859 B1 * | 10/2018 | Suiter ............... G06V 20/20 |
| 10,114,466 B2 | 10/2018 | Patel et al. |
| 10,127,725 B2 | 11/2018 | Kohler et al. |
| 10,192,358 B2 | 1/2019 | Robbins |
| 10,204,454 B2 | 2/2019 | Goldman et al. |
| 10,215,989 B2 | 2/2019 | Harrison et al. |
| 10,565,779 B2 | 2/2020 | Lo et al. |
| 10,591,738 B2 | 3/2020 | Svarichevsky et al. |
| 11,177,693 B1 * | 11/2021 | Puskarich ............ H02J 50/005 |
| 11,586,286 B1 * | 2/2023 | Singh ................... G06F 3/013 |
| 2004/0196214 A1 | 10/2004 | Maguire, Jr. |
| 2006/0066459 A1 | 3/2006 | Burch et al. |
| 2007/0035563 A1 | 2/2007 | Biocca et al. |
| 2013/0194304 A1 | 8/2013 | Kohler et al. |
| 2014/0002491 A1 | 1/2014 | Lamb et al. |
| 2015/0154803 A1 | 6/2015 | Meier et al. |
| 2016/0124504 A1 | 5/2016 | Lee et al. |
| 2016/0267720 A1 | 9/2016 | Mandella et al. |
| 2016/0379408 A1 * | 12/2016 | Wright ............... G02B 27/0172 345/633 |
| 2017/0168306 A1 | 6/2017 | Dreyer et al. |
| 2017/0206668 A1 | 7/2017 | Poulos et al. |
| 2017/0309049 A1 | 10/2017 | Law et al. |
| 2018/0018792 A1 | 1/2018 | Ballard et al. |
| 2018/0061139 A1 | 3/2018 | Rodriguez et al. |
| 2018/0082483 A1 | 3/2018 | Moravetz |
| 2018/0122143 A1 | 5/2018 | Ellwood, Jr. |
| 2019/0082169 A1 * | 3/2019 | Goossens ............... G06F 3/011 |
| 2019/0295320 A1 * | 9/2019 | Ghatak ................. G06F 3/011 |
| 2020/0379556 A1 | 12/2020 | Moravetz |

* cited by examiner

SYSTEM AND METHOD FOR NAVIGATING ON AN AUGMENTED REALITY DISPLAY

CROSS-REFERENCE TO RELATED APPLICATION

The application is a continuation of U.S. patent application Ser. No. 17/747,568, filed May 18, 2022, by Shailendra Singh, and entitled "SYSTEM AND METHOD FOR NAVIGATING ON AN AUGMENTED REALITY DISPLAY," which is incorporated herein by reference.

TECHNICAL FIELD

The present disclosure relates generally to an augmented reality object processing, and more specifically to a system and method for navigating on an augmented reality display.

BACKGROUND

Websites provide services and/or products to visitors of the websites. A user may visit a website to perform a task. The user may not be familiar with the website and may not know how to navigate through the website. The user may use a user manual or user instructions of the website (online or physical copy) to learn how to navigate the website. However, this process is time-consuming and prone to human error.

SUMMARY

The system described in the present disclosure is particularly integrated into a practical application of improving navigation on websites, web applications, software applications, and mobile applications (collectively referred to herein as a web application). The disclosed system is further integrated into an additional practical application of improving the underlying operations of the web applications. These practical applications provide several technical advantages, including improving the web development technologies and improving troubleshooting a failure detected in a web application. These practical applications and technical advantages are described below.
Navigating a Web Application Using an Augmented Reality Display The present disclosure contemplates systems and methods configured to provide navigation on a web application using an augmented reality display. In an example scenario, assume that a user wants to use a website or a web application to perform a task. The task may include opening a new account on the website, submitting a form, accessing a service provided on the website, accessing a product provided on the website, or any other operation that the website offers to its users.

In some cases, the user may not be familiar with the web application, and may not know how to navigate through the web application. In some cases, the user may not know how to perform the task on the web application. In such cases, the user struggles in navigating through the web application. One potential approach is to provide a user manual of the web application (online or physical copy) to the user so that the user can read the user manual and learn how to navigate the web application. However, this approach suffers from several drawbacks. For example, this approach is time-consuming and prone to human error.

The disclosed system is configured to leverage augmented reality technology for user navigation on the web application. To this end, the disclosed system provides an augmented reality device (e.g., augmented reality glasses) to the user. The augmented reality device is paired with a server that is configured to provide augmented reality navigation messages and instructions to the augmented reality device. The user can wear the augmented reality device and see the augmented reality navigation messages and instructions for each element (e.g., buttons, text fields, hyperlinks, etc.) that the user is looking at on the augmented reality device's transparent or clear glasses or glass alloy.

For example, assume that the user puts on the augmented reality device. The augmented reality device is paired with the server. The user (wearing the augmented reality device) is looking at the web application presented on a display screen of a user device. As the user is looking at different elements (e.g., buttons, text fields, hyperlinks) on the web application, the augmented reality device tracks the eye movements of the user.

The augmented reality device produces eye tracking information that indicates the gaze point to which the user is looking at every time interval (e.g., every second, every millisecond, every ten milliseconds, etc.). The augmented reality device also captures images of a field of view in front of it. The images may include the background (e.g., a portion of a table, a keyboard, a desk, a monitor, etc.) and the display screen where the web application is presented. The augmented reality device transmits the images and the eye tracking information to the server for processing.

The server processes the images and eye tracking information and determines to which location coordinate (and which element on the web application) the user is looking at every given time interval (e.g., every second, every millisecond, every ten milliseconds, etc.). For example, assume that the server determines that the user is looking at a first element located at a first location coordinate on a first image frame.

The server identifies the first element by feeding the first image to an image processing machine learning algorithm. For example, the backed server may determine that the first element is an approval button, a next button, a link to a particular web page, a text field to input comments, etc.

The backed server identifies the element attributes of the first element. The element attributes may indicate the function, purpose, context, how to use instructions, acceptable input format, and other information related to the first element. The element attributes may be defined in the model-viewer-controller layers associated with the first elements that are defined in the development stage of the web application.

The server generates an augmented reality message that includes navigation and/or guidance instructions on how to use the first element, what happens if the first element is actuated, filled out, or pressed, the function of the first element, the context of the first element, and other element attributes of the first element.

The server then generates an augmented frame in which the augmented reality message is displayed as a virtual object. The server anchors the augmented reality message to the first element (or to the location coordinate of the first element) on the augmented frame. The server may also generate subsequent augmented frames in which the augmented reality message is displayed as a virtual object (e.g., if the user keeps looking at the first element).

The server generates an augmented reality display by putting together a stream of augmented frames. The server transmits the augmented reality display to the augmented reality device. The augmented reality device displays the augmented reality display on the transparent cover or potion (e.g., similar to glasses). The augmented reality display is superimposed on a field of view that shows the web application as seen by the user wearing the augmented reality device. Thus, the user can see the augmented reality message from the augmented reality device. The augmented reality message may include information that the user can use to navigate through the web application.

As the user looks at different elements, respective augmented reality messages may be displayed on the augmented reality display that is projected on the augmented reality device. In this manner, the user is informed about different elements and their functions and navigates through the web application accordingly. For example, if the user wants to perform a particular task on the web application, the user can use the navigation messages to navigate through the web application and perform the particular task in less time and more efficiently.

As such, the disclosed system is integrated into a practical application of improving navigation on a web application. Furthermore, the system is integrated into an additional practical application of improving the underlying operation of the web application. For example, the disclosed system is configured to detect an error message from images of the web application captured by the augmented reality device. In response, the system records the images of the web application that shows user activities that led to the error message. The system communicates a data package of evidence that includes the images of the web application (that shows user activities that led to the error message) to developers for troubleshooting the detected error.

In one embodiment, a system for navigating on an augmented reality display comprises a memory and a processor. The memory is configured to store a web application comprising a plurality of elements that comprise at least one of a button, a text field, and a hyperlink. The memory is further configured to store a mapping table comprising a mapping between each of the plurality of elements mapped to a respective element attribute. A first element from among the plurality of elements is mapped to a first element attribute, wherein the first element attribute comprises at least one of a first function of the first element. A second element from among the plurality of elements is mapped to a second element attribute, wherein the second element attribute comprises a second function of the second element. The processor is operably coupled with the memory. The processor receives, from an augmented reality device, a first image of the web application, wherein the first image of the web application shows the first element. The processor receives, from the augmented reality device, eye tracking information that indicates the eye movements of a user as the user is looking at different elements on the web application. The processor determines, based at least in part upon the eye tracking information, that the user is looking at a first location coordinate on the first image of the web application. The processor determines that the first element is located at the first location coordinate. The processor identifies the first element attribute that is associated with the first element. The processor generates an augmented reality message comprising the first element attribute. The processor generates an augmented reality display in which the augmented reality message is presented as a virtual object. The processor anchors the augmented reality message to the first location coordinate on the augmented reality display. The processor communicates the augmented reality display to the augmented reality device, such that the augmented reality display is superimposed on a field of view that shows the web application as seen by the user using the augmented reality device.

Updating Augmented Reality Navigation Instructions Based on a Detected Error

The present disclosure further contemplates systems and methods configured to updating augmented reality navigation instructions based on a detected error. In an example scenario, assume that when the user presses or clicks on an element (e.g., a button) on the web application, the web application fails by showing an error message. In such cases, the disclosed system records the user events that led to the error message. The user events include actuating the element. The disclosed system transmits the user events and images of the web application to developers for troubleshooting the element. The disclosed system also updates the augmented reality message for the element by indicating that the element is faulty. Thus, if a second user, using a second augmented reality device, looks at the faulty element, the disclosed system transmits the updated augmented reality message to the second augmented reality device instead of the predefined navigation message. The second user is informed that the element is faulty by seeing the augmented reality message for the faulty element. The disclosed system may also include a suggestion to use another element that is configured to perform a same function as the faulty element in the augmented reality message of the faulty element.

As such, the disclosed system is integrated into a practical application of improving the underlying operation of the web application, e.g., by communicating the user events to developers for troubleshooting the faulty element. Furthermore, the disclosed system is integrated into an additional practical application of improving navigation on a web application by detecting the faulty elements and providing suggestions of other navigation routes and/or elements to use instead of the faulty elements.

In one embodiment, a system for updating augmented reality navigation instructions based on errors comprises a memory and a processor. The memory is configured to store a web application comprising a plurality of elements that comprise at least one of a button, a text field, and a hyperlink. The memory is further configured to store a mapping table comprising a mapping between each of the plurality of elements mapped to a respective element attribute, such that a first element from among the plurality of elements is mapped to a first element attribute, wherein the first element attribute comprises at least one of a first function of the first element, and a second element from among the plurality of elements is mapped to a second element attribute, wherein the second element attribute comprises a second function of the second element. The processor is operably coupled with the memory. The processor receives, from a first augmented reality device, a first image of the web application that shows the first element. The processor receives, from the first augmented reality device, eye tracking information that indicates eye movements of a first user as the first user is looking at different elements on the web application. The processor determines, based at least in part upon the eye tracking information, that the first user is looking at a first location coordinate on the first image of the web application. The processor determines that the first element is located at the first location coordinate. The processor determines that the first element is actuated. The processor receives, from the first augmented reality device, a second image of the web application that shows an error message, wherein the error message indicates that the web application has failed. The processor determines that the first element is faulty in response to the error message. In response to determining that the first element is faulty, the processor records user events that led to failing the web application, wherein the user events comprise actuating the first element. The processor updates an augmented reality message for the first element by indicating that the first element is faulty. The processor generates an augmented reality display in which the updated augmented reality message is presented as a virtual object. The processor anchors the updated augmented reality message to the first location coordinate on the augmented reality display. The processor communicates the updated augmented reality message for the first element to a second augmented reality device in response to determining that a second user wearing the second augmented reality device is looking at the first element.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
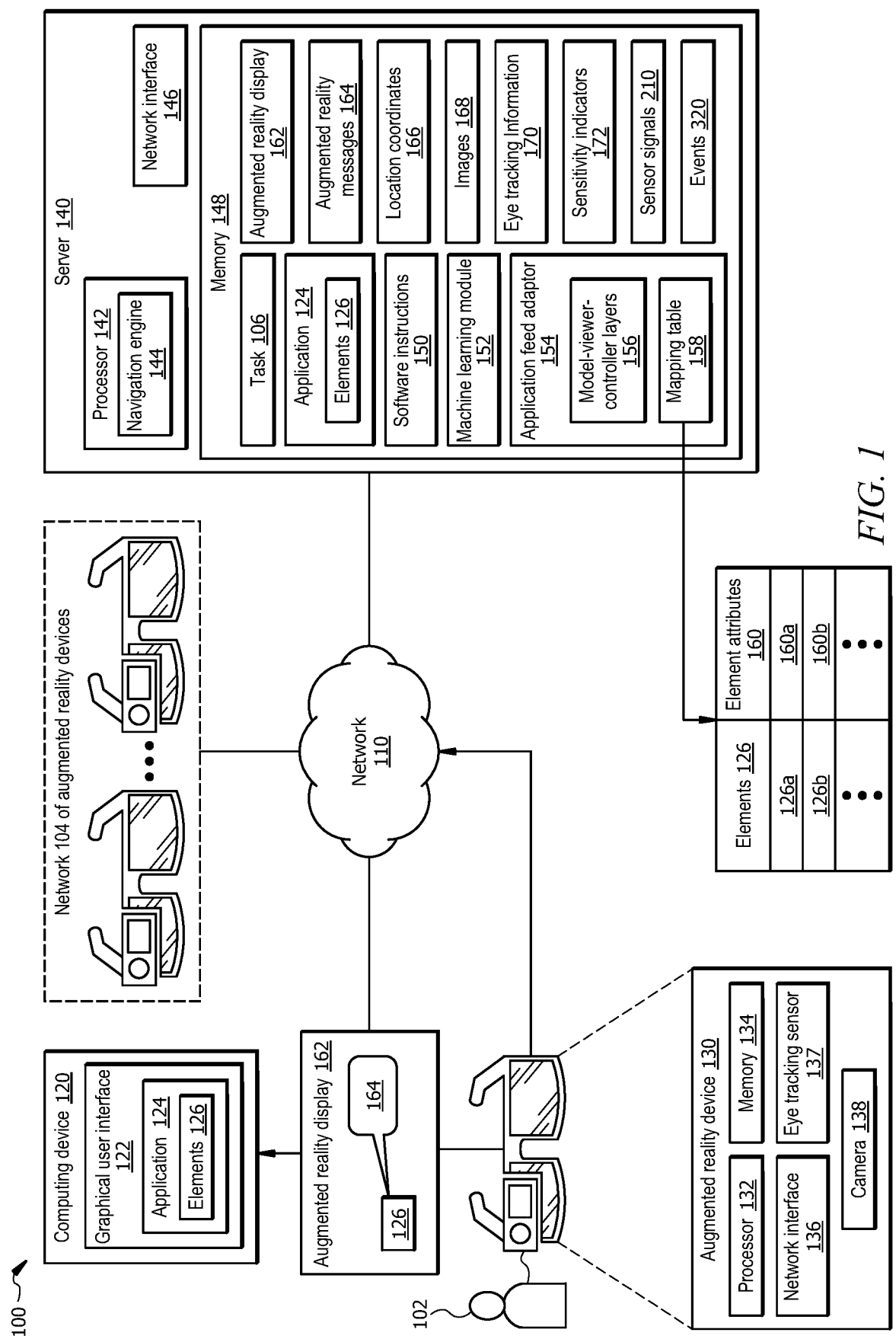
FIG. 1 illustrates an embodiment of a system configured to navigate on an augmented reality display.

As described above, previous technologies fail to provide efficient and reliable solutions to provide a reliable solution for navigating on an augmented reality display. Embodiments of the present disclosure and its advantages may be understood by referring to FIGS. 1 through 5. FIGS. 1 through 5 are used to describe a system and method for navigating on an augmented reality display, and a system and method for updating augmented reality navigation instructions based on a detected error.
System Overview FIG. 1 illustrates an embodiment of a system 100 that is generally configured to populate augmented reality navigation and guidance messages 164 on an augmented reality display 162 for navigating a user on a web application 124 presented on a user interface 122. In certain embodiments, the system 100 comprises a server 140 communicatively coupled with a computing device 120, an augmented reality device 130, and a network 104 of augmented reality devices via a network 110. Network 110 enables the communication between the components of the system 100. Server 140 comprises a processor 142 in signal communication with a memory 148. Memory 148 stores software instructions 150 that when executed by the processor 142, cause the processor 142 to perform one or more operations described herein. For example, when the software instructions 150 are executed, the processor 142 executes the navigation engine 144 that is configured to extract images from the augmented reality device 130, determine the eye movements of the user 102 who is wearing the augmented reality device 130 and looking at the application 124, determine an element 126 of the application 124 that the user 102 is looking at, determine the location coordinate 166 of the element 126, determine element attributes 160 associated with the element 126, generate an augmented reality message 164, generate an augmented reality display 162 in which the augmented reality message 164 is anchored to the location coordinate 166 of the element 126 (or to the element 126), and communicate the augmented reality display 162 to the augmented reality device 130, such that the user 102 can see the augmented reality message 164 anchored to the element 126 from the augmented reality device 130. In other embodiments, system 100 may not have all of the components listed and/or may have other elements instead of, or in addition to, those listed above.

In an example scenario, the user 102 may want to use the web application 124 to perform a task 106. The task 106 may include opening a new account on the web application 124, submitting a form, accessing a service provided by an organization associated with the web application 124, accessing a product provided by the organization associated with the web application 124 or any other operation that the web application 124 offers to its users 102. In some cases, the user 102 may not be familiar with the web application 124, and not know how to navigate through the web application 124. In some cases, the user 102 may not know how to perform the task 106 on the web application 124. In such cases, the user 102 struggles in navigating through the web application 124. One potential approach is to provide a user manual of the web application 124 (online or physical copy) to the user 102 so that the user 102 can read the user manual and learn how to navigate the web application 124. However, this approach suffers from several drawbacks. For example, this approach is time-consuming and prone to human error.

Accordingly, system 100 is configured to leverage augmented reality technology for user navigation on the web application 124. As such, the system 100 is integrated into a practical application of improving navigation on a web application 124. As the navigation for a particular task 106 is improved, the user 102 can perform the task 106 in less time and more efficiently. Furthermore, the system 100 is integrated into an additional practical application of improving the underling operation of the web application 124. For example, the system 100 is configured to detect an error message from images of the web application 124 captured by the augmented reality device 130. In response, the system 100 records the images of the web application 124 that shows user activities that led to the error message. The system 100 communicates a data package of evidence that include the images of the web application 124 (that shows user activities that led to the error message) to developers for troubleshooting the detected error.
System Components
Network Network 110 may be any suitable type of wireless and/or wired network. The network 110 is not connected to the Internet or public network. The network 110 may include all or a portion of an Intranet, a peer-to-peer network, a switched telephone network, a local area network (LAN), a wide area network (WAN), a metropolitan area network (MAN), a personal area network (PAN), a wireless PAN (WPAN), an overlay network, a software-defined network (SDN), a virtual private network (VPN), a mobile telephone network (e.g., cellular networks, such as 4G or 5G), a plain old telephone (POT) network, a wireless data network (e.g., WiFi, WiGig, WiMax, etc.), a long-term evolution (LTE) network, a universal mobile telecommunications system (UMTS) network, a peer-to-peer (P2P) network, a Bluetooth network, a near field communication (NFC) network, and/or any other suitable network that is not connected to the Internet. The network 110 may be configured to support any suitable type of communication protocol as would be appreciated by one of ordinary skill in the art.

Computing Device

Computing device 120 is generally any device that is configured to process data and interact with users 102. Examples of the computing device 120 include, but are not limited to, a personal computer, a desktop computer, a workstation, a server, a laptop, a tablet computer, a mobile phone (such as a smartphone), etc. The computing device 120 may include a user interface, such as a display, a microphone, keypad, or other appropriate terminal equipment usable by user 102. The computing device 120 may include a hardware processor, memory, and/or circuitry (not explicitly shown) configured to perform any of the functions or actions of the computing device 120 described herein. For example, a software application designed using software code may be stored in the memory and executed by the processor to perform the functions of the computing device 120. The computing device 120 is configured to communicate with other devices via the network 110, such as the server 140. The computing device 120 includes a display screen that is configured to show the graphical user interface 122. The application 124 is presented on the graphical user interface 122. The application 124 may be a software application, a web application, a mobile application, or a website. The application 124 may be interchangeably referred to as a web application 124.

The web application 124 may be associated with an organization that provides services and/or products to its clients. The web application 124 may present (or list) the services and/or products provided by the organization. The web application 124 may include elements 126. The elements 126 may include buttons, text fields, hyperlinks, attachment boxes, and/or any other element 126 that can be presented on the web application 124.

The web application 124 may include multiple pages (e.g., web pages) or portions. The user 102 may need to navigate to multiple web pages to perform a task 106. The augmented reality device 130 may show multiple augmented reality messages 164 for multiple elements 126 that are determined the user 102 is looking at (and/or are determined to be relevant to the task 106). The augmented reality device 130 may show multiple augmented reality messages 164 at once or one at a time depending on when the user 102 is looking at each element 126.

Augmented Reality Device

Augmented reality device 130 generally comprises a hardware device that is configured to display augmented reality (i.e., virtual) objects on an augmented reality display 162. Examples of the augmented reality device 130 include, but are not limited to, an augmented reality device, a smart device, an Internet-of-Things (IoT) device, a pair of smart glasses, a wearable device, or any other suitable type of device. The augmented reality device 130 is configured to display a two-dimensional (2D) or three-dimensional (3D) representation of a virtual environment on the augmented reality display 162. Examples of an augmented reality display 162 include, but are not limited to, a graphical or virtual representation of an environment that includes the augmented reality messages 164 anchored to the respective elements 126 (and/or the location coordinates 166 of the respective elements 126).

In certain embodiments, the augmented reality device 130 may include a processor 132, a memory 134, a network interface 136, an eye tracking sensor 137, and a camera 138. The components of the augmented reality device 130 are operably coupled to each other wirelessly and/or via wires.

Processor 132 comprises one or more processors operably coupled to the memory 134. The processor 132 is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). The processor 132 may be a programmable logic device, a microcontroller, a microprocessor, or any suitable combination of the preceding. The one or more processors are configured to process data and may be implemented in hardware or software. For example, the processor 132 may be 8-bit, 16-bit, 32-bit, 64-bit, or of any other suitable architecture. The processor 132 may include an arithmetic logic unit (ALU) for performing arithmetic and logic operations. The processor 132 may register the supply operands to the ALU and store the results of ALU operations. The processor 132 may further include a control unit that fetches instructions from memory and executes them by directing the coordinated operations of the ALU, registers and other components. The one or more processors are configured to implement various software instructions. For example, the one or more processors are configured to execute software instructions to perform one or more functions of the augmented reality device 130 described herein. In this way, processor 132 may be a special-purpose computer designed to implement the functions disclosed herein. In an embodiment, the processor 132 is implemented using logic units, FPGAs, ASICs, DSPs, or any other suitable hardware. The processor 132 is configured to operate as described in FIGS. 1-5.

In certain embodiments, the processor 132 may receive the images 168 from the camera 138 and eye tracking information 170 and determine the user's eye movements based on the images 168 and eye tracking information 170. The processor 132 may transmit this information to the server 140. In certain embodiments, the processor 132 may transmit processed data to the server 140.

In certain embodiments, processor 132 may send raw or unprocessed data (e.g., images 168 and sensor data from the eye tracking sensor 137) to the server 140, and the server 140 may determine the eye tracking information 170 and location coordinates 166 of elements 126 to which the user 102 is looking.

Memory 134 may be volatile or non-volatile and may comprise a read-only memory (ROM), random-access memory (RAM), ternary content-addressable memory (TCAM), dynamic random-access memory (DRAM), and static random-access memory (SRAM). Memory 134 may be implemented using one or more disks, tape drives, solid-state drives, and/or the like. The memory 134 may store any of the information described in FIGS. 1-5 along with any other data, instructions, logic, rules, or code operable to implement the function(s) described herein when executed by processors 142. The memory 134 is operable to store images 168 and eye tracking information 170, and/or any other data and instructions, such as software instructions to execute the processor 132. The software instructions may comprise any suitable set of software instructions, logic, rules, or code operable to execute the processor 132 to perform the functions of the processor 132.

Network interface 136 is configured to enable wired and/or wireless communications (e.g., via network 110). The network interface 136 is configured to communicate data between the augmented reality device 130 and other devices (e.g., computing devices 120), server 140, systems, databases, systems, or domains. For example, the network interface 136 may comprise a WIFI interface, a local area network (LAN) interface, a wide area network (WAN) interface, a modem, a switch, or a router. The processor 132 is configured to send and receive data using the network interface 136. The network interface 136 may be configured to use any suitable type of communication protocol as would be appreciated by one of ordinary skill in the art.

Eye tracking sensor 137 may be or include a sensor that is configured to track eye movements of a user 102 who is wearing the augmented reality device 130. In certain embodiments, the eye tracking sensor 137 may include a light source unit (e.g., a Light Emitting Diode (LED) light source) to emit modulated light toward the user 102. The eye tracking sensor 137 may include image optics (e.g., one or more micro lenses) to receive and input light into the eye tracking sensor 137. In certain embodiments, the eye tracking sensor 137 may include photodetector array to detect light transmitted through imaging optics.

In implementation, the eye tracking sensor 137 may be configured to emit modulated light (e.g., invisible near-infrared light) onto the eye (e.g., more specifically onto the pupil of the eye) and detect the reflected light off of the ere (e.g., more specifically off of the cornea). Based on the emitted light and reflected light, the eye tracking sensor 137 determines the positions of the pupil and the direction the eyes are looking at.

In certain embodiments, the eye tracking sensor 137 may include a camera (not shown in FIG. 1) that is facing the user 102 who is wearing the eye tracking sensor 137. The camera captures high-resolution images of the user's eye and patterns of movements of the pupil. The eye tracking sensor 137 and/or the processor 132 may implement image processing algorithms to determine the locations of the user's eyes and light reflection patterns bounced off of the cornea. Based on this information, the eye tracking sensor 137 (and/or the processor 132) may determine the user's gaze point.

In certain embodiments, when the user 102 is looking at a particular location on the application 124, the eye tracking sensor 137 (and/or the processor 132) may determine the location coordinate 166 on the web application 124 that the user 102 is looking at based on the sensor data captured by the eye tracking sensor 137 and the images of the web application 124 captured by the camera 138. In certain embodiments, the eye tracking sensor 137 may implement data filtering to remove noise from the eye movement detection process.

Camera 138 may be or include any camera that is configured to capture images of a field of view in front of the augmented reality device 130. Examples of the camera 138 may include charge-coupled device (CCD) cameras and complementary metal-oxide semiconductor (CMOS) cameras. The camera 138 is configured to capture images 168 (e.g., of the application 124) within a real environment. The camera 138 is a hardware device that is configured to capture images 168 continuously, at predetermined intervals, or on-demand. For example, the camera 138 is configured to receive a command from a user 102 to capture an image 168. In another example, the camera 138 is configured to continuously capture images 168 to form a video stream of images 168. For example, when the user 102 wears the augmented reality device 130 and the augmented reality device 130 is paired (e.g., authenticated) with the server 140 (e.g., via the application feed adaptor 154), the camera 138 may start capturing images 168 and the eye tracking sensor 137 may start tracking the eyes of the user 102 and produce eye tracking information 170.

Server

Server 140 is generally a hardware device that is configured to process data and communicate with other components of the system 100 via the network 110. The server 140 is configured to oversee the operations of the processor 142 aa described further below and in conjunction with the operational flow 200 described in FIG. 2, operational flow 300 described in FIG. 3, the method 400 described in FIG. 4, and the method 500 described in FIG. 5.

Processor 142 comprises one or more processors operably coupled to the memory 148. The processor 142 is any electronic circuitry, including, but not limited to, state machines, one or more central processing unit (CPU) chips, logic units, cores (e.g., a multi-core processor), field-programmable gate arrays (FPGAs), application-specific integrated circuits (ASICs), or digital signal processors (DSPs). For example, one or more processors may be implemented in cloud devices, servers, virtual machines, and the like. The processor 142 may be a programmable logic device, a microcontroller, a microprocessor, or any suitable combination of the preceding. The one or more processors are configured to process data and may be implemented in hardware or software. For example, the processor 142 may be 8-bit, 16-bit, 32-bit, 64-bit, or of any other suitable architecture. The processor 142 may include an arithmetic logic unit (ALU) for performing arithmetic and logic operations, registers the supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute instructions (e.g., software instructions 150) to implement the processor 142. In this way, processor 142 may be a special-purpose computer designed to implement the functions disclosed herein. In an embodiment, the processor 142 is implemented using logic units, FPGAs, ASICs, DSPs, or any other suitable hardware. The processor 142 is configured to operate as described in FIGS. 1-5. For example, the processor 142 may be configured to perform one or more operations of method 400 as described in FIG. 4 and one or more operations of method 500 as described in FIG. 5.

Network interface 146 is configured to enable wired and/or wireless communications. The network interface 146 may be configured to communicate data between the server 140 and other devices, systems, or domains. For example, the network interface 146 may comprise an NFC interface, a Bluetooth interface, a Zigbee interface, a Z-wave interface, a radio-frequency identification (RFID) interface, a WIFI interface, a LAN interface, a WAN interface, a MAN interface, a PAN interface, a WPAN interface, a modem, a switch, and/or a router. The processor 142 may be configured to send and receive data using the network interface 146. The network interface 146 may be configured to use any suitable type of communication protocol.

The memory 148 may be volatile or non-volatile and may comprise read-only memory (ROM), random-access memory (RAM), ternary content-addressable memory (TCAM), dynamic random-access memory (DRAM), and static random-access memory (SRAM). The memory 148 may include one or more of a local database, cloud database, network-attached storage (NAS), etc. The memory 148 comprises one or more disks, tape drives, or solid-state drives, and may be used as an over-flow data storage device, to store programs when such programs are selected for execution, and to store instructions and data that are read during program execution. The memory 148 may store any of the information described in FIGS. 1-5 along with any other data, instructions, logic, rules, or code operable to implement the function(s) described herein when executed by processor 142. For example, the memory 148 may store software instructions 150, application 124, machine learning module 152, application feed adaptor 154, images 168, eye tracking information 170, location coordinates 166, augmented reality messages 164, augmented reality display 162, sensitivity indicators 172, tasks 106, sensor signals 210, events 320, and/or any other data or instructions. The software instructions 150 may comprise any suitable set of instructions, logic, rules, or code operable to execute the processor 142 and perform the functions described herein, such as some or all of those described in FIGS. 1-5.

Application Feed Adaptor

Application feed adaptor 154 may be implemented by the processor 142 executing the software instructions 150, and is generally configured to establish a communication between the server 140 and the augmented reality device 130, and provide information about the elements 126. For example, the application feed adaptor 154 may be implemented by hardware and/or software modules to pair (e.g., establish a link) between the server 140 and the augmented reality device 130.

In certain embodiments, the application feed adaptor 154 may determine whether the augmented reality device 130 is authenticated or verified to be connected to the server 140. For example, in this process, in the initial pairing request, the augmented reality device 130 may transmit a unique identifier associated with the augmented reality device 130 to the server 140. The application feed adaptor 154 may include or be communication with a database (not shown) that stores the unique identifier of the augmented reality device 130. The application feed adaptor 154 (and/or the server 140) may authenticate or verify the augmented reality device 130 if the unique identifier of the augmented reality device 130 is found in the database. In other examples, the augmented reality device 130 may be authenticated or verified by using any suitable credentialing method.

In certain embodiments, the application feed adaptor 154 may pair the server 140 to the augmented reality device 130 via Ultra Wide Band (UWB) network 110. The UWB network 110 allows a large bandwidth to transfer data between the server 140 and the augmented reality device 130. In certain embodiments, because the transmission of images 168, eye tracking information 170, and the augmented reality display 162 require a large network bandwidth, the UWB network 110 may be used.

The application feed adaptor 154 is associated with the application 124. When the user 102 wears the augmented reality device 130 and wants to navigate in the application 124, the user 102 may initiate a communication (or user session) between the augmented reality device 130 and the server 140 (via the application feed adaptor 154). When the connection (or pairing) between the augmented reality device 130 and the server 140 is established, the application feed adaptor 154 may facilitate data communication between the augmented reality device 130 and the server 140.

The application feed adaptor 154 may include model-viewer-controller layers 156 and mapping table 158. The model-viewer-controller layers 156 may represent the software infrastructure of the application 124. The model-viewer-controller layers 156 may include a model layer, a viewer layer, and a controller layer. The model layer defines the data structures and data formats of the elements 126. For example, the model layer may define a particular data format that is accepted by an element 126—e.g., a text box element 126 to fill a phone number should only accept a 10-digit number. The model layer manages the data and business logic of the application 124 and its elements 126. The viewer layer handles the layout and display of the application 124 and its elements 126. For example, the viewer layer indicates shapes, sizes, colors, and generally how elements 126 look. The controller layer routes commands to the model and viewer layers. The controller layer includes the control logic and business logic of the elements 126. For example, the controller layer may indicate the functions of the elements 126, e.g., what happens if an element 126 (e.g., a button) is pressed or actuated, an element 126 (e.g., a hyperlink) is pressed or actuated, etc.

Mapping table 158 may include a mapping between each element 126 and its respective element attribute 160. The element attribute 160 of an element 126 may include a function of the element 126 (e.g., what happens when the element 126 is actuated), an input data format that is accepted by the element 126 (e.g., an element 126 for entering a phone number can only accept 10-digit number), how to use the element 126, the purpose of the element 126, tasks 106 that are associated with the element 126, and/or any other information associated with the element 126.

In the illustrated example, the mapping table 158 includes the mapping for elements 126a and 126b. The element 126a is mapped to the element attributes 160a. The element attributes 160a include the function of the element 126a, input data format that is accepted by the element 126a, and/or any other information associated with the element 126a. The element 126b is mapped to the element attributes 160b. The element attributes 160b include the function of the element 126b, an input data format that is accepted by the element 126b, and/or any other information associated with the element 126b. In certain embodiments, the mapping table 158 may also include a layout of the web application 124, e.g., where each element 126 is located.

Navigation Engine

Navigation engine 144 may be implemented by the processor 142 executing the software instructions 150, and is generally configured to determine a location coordinate 166 of an element 126 that the user is looking at, generate an augmented reality message 164 that comprises the element attributes 160 associated with the element 126, generate an augmented reality display 162 in which the augmented reality message 164 is anchored to the element 126 (or the location coordinate 166 of the element 126), and communicate the augmented reality display 162 to the augmented reality device 130. Thus, the user 102 can navigate through the application 124 based on virtual messages 164 that include guidance and navigation instructions and/or messages.

In certain embodiments, the navigation engine 144 may implement a machine learning module 152 to perform any of its operations. The machine learning module 152 may be implemented by a plurality of neural network layers, convolutional neural network layers, Long-Short-Term-Memory (LSTM) layers, Bi-directional LSTM layers, recurrent neural network layers, and the like. In certain embodiments, the machine learning module 152 may be implemented by an image processing, natural language processing, or any suitable technique to perform the operations of the navigation engine 144.

In certain embodiments, the navigation engine 144 may be configured to extract metadata from the images 168 of the web application 124, e.g., via the machine learning module 152. For example, the navigation engine 144 may feed the images 168 to the machine learning module 152 to extract metadata (e.g., identifications and locations of elements 126) from the images 168. In this manner, the navigation engine 144 may recognize the elements 126 shown in the images 168.

In certain embodiments, the navigation engine 144 may map the foreground of the application 124 presented on the graphical user interface 122 with the virtual reality display 162. For example, the navigation engine 144 may determine the mapping between each pixel in the image 168 of the application 124 with a respective point on the augmented reality display 162.

In certain embodiments, the navigation engine 144 may determine the mapping between each point on the augmented reality display 162 and the physical environments in a field of view of the augmented reality device 130.

Network of Augmented Reality Devices

Network 104 of augmented reality devices includes multiple augmented reality devices 130. Each of the augmented reality devices in the network 104 may be an instance of the augmented reality device 130. The augmented reality devices 130 in the network 104 may be communicatively coupled with one another wirelessly through the network 110. The augmented reality devices 130 may share information with one another, e.g., directly via WiFi or via network 110. For example, if an error message 310 (see FIG. 3) is detected from an image 168 captured by a first augmented reality device 130, the error message 310 and events 320 (see FIG. 3) that led to the error message 310 may be used by the navigation engine 144 to update the navigation augmented reality message 164 for an element 126 that is determined to be faulty and led to the error message 310. The updated augmented reality message 164 for the faulty element 126 may be communicated to the other augmented reality devices 130 in the network 104 when users look at the faulty element 126 at their respective computing devices 120. For example, the updated augmented reality message 164 for the faulty element 126 may include text that indicates this element 126 is faulty and suggest another element 126 or another route that directs the user to an appropriate web page or to perform a task 106 that is determined the user 102 wants to perform. This process is described in greater detail in FIG. 3.

Example Operational Flow for Navigating on an Augmented Reality Display

Figure 2:
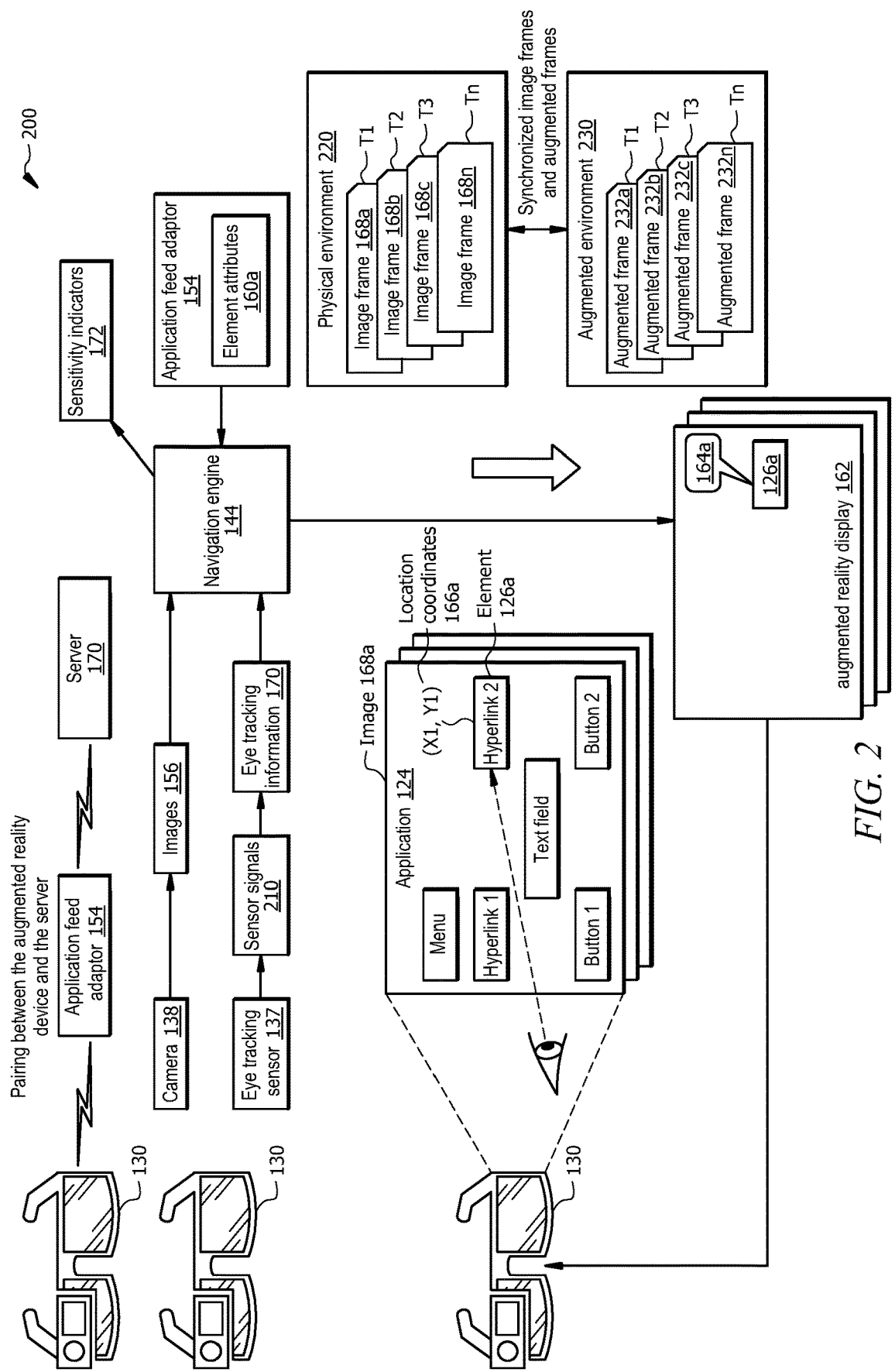
FIG. 2 illustrates an example operational flow of system of FIG. 1 for navigating on an augmented reality display.

FIG. 2 illustrates an example operational flow 200 of system 100 of FIG. 1 for navigating on an augmented reality display 162. The operational flow 200 may begin when the augmented reality device 130 is paired with the server 140 (e.g., via the application feed adaptor 154), similar to that described in FIG. 1.

In an example scenario, assume that the user 102 wants to navigate through the application 124. The user 102 wears the augmented reality device 130 and initiates pairing (e.g., handshaking) between the augmented reality device 130 and the server 140. Once the pairing process is successful, a communication channel or link is established between the augmented reality device 130 and the server 140.

Capturing Images of the Web Application and Eye Tracking Information

The camera 138 may initiate capturing images 168 of the field of view in front of the augmented reality device 130. The images 168 may show the foreground of the application 124 presented on the interface 122 on the display screen of the computing device 120, and a background area (e.g., a portion of a table, a desk, a monitor, a keyboard, etc. The camera 138 may transmit the images 168 to the processor 132 of the augmented reality device 130.

The eye tracking sensor 137 may initiate transmitting invisible light onto the eyes of the user 102 (e.g., onto the pupils) and receiving reflected light bounced off of the eyes (e.g., from the corneas). The eye tracking sensor 137 (via a camera not explicitly shown) may capture images of the eyes of the user 102. The eye tracking sensor 137 may produce sensor signals 210. The sensor signals 210 may include images of the eye of the user 102 that shows the light emitted on the eyes of the user 102 (e.g., more specifically onto the pupils of the eyes) and the reflected light bounced off of the eyes (e.g., more specifically off of corneas), similar to that described in FIG. 1. The eye tracking sensor 137 may transmit the sensor signals 210 to the processor 132.

The processor 132 receives the sensor signals 210. The processor 132 may determine the eye tracking information 170 by analyzing the sensor signals 210. The eye tracking information 170 may indicate eye movements of the user 102 as the user 102 is looking at different elements 126 on the web application 124. The eye tracking information 170 may indicate a gaze point on which the eyes of the user 102 are focused. The eye tracking information 170 may be determined by emitting the invisible light on the eyes of the user 102, receiving the reflected light bounced off of the eyes, determining, based on the emitted light and the reflected light, a direction to which the eyes are looking, and determining the gaze point to which the eyes are focused based on the determined direction or rejection of the eyes. The processor 132 transmits the images 168 and the eye tracking information 170 to the server 140.

Determining an Element on the Application to which the User is Looking

The server 140 receives the images 168 and the eye tracking information 170. The navigation engine 144 determines to which element 126 the user 102 is looking at from each image 168 of the web application 124. For example, assume that the navigation engine 144 receives the first image 168a of the web application 124 shown at the bottom of FIG. 2. The first image 168a of the web application 124 shows multiple elements 126 in the foreground of the web application 124 including the first element 126a.

The navigation engine 144 determines that the user 102 is looking at the first location coordinate 166a on the first image 168a of the web application 124 based on the eye tracking information 170, the pixels of the image 168a, and the trajectory of the eyes of the user 102. The navigation engine 144 determines that the element 126a is located at the location coordinate 166a. In the illustrated example, the location coordinate 166a is represented by (X1, Y1). In this process, the navigation engine 144 may implement image processing algorithms to identify the element 126a at the location coordinate 166a on the image 168a.

The navigation engine 144 identifies the first element attributes 160a that is associated with the first element 126a. In this process, the navigation engine 144 may search the mapping table 158 (see FIG. 1) and determine that the first element 126a is associated with the first element attributes 160a. Aspects of the first element attributes 160a are described in FIG. 1.

The navigation engine 144 may determine the contextual data associated with the first element 126a based on the first element attributes 160a. For example, the first element attributes 160a may include the contextual data that indicates the purpose of the first element 126a. The purpose of the first element 126 may indicate for what task(s) 106, the first elements 126a is used.

The navigation engine 144 may generate an augmented reality message 164a as a virtual message. In certain embodiments, the augmented reality message 164a may include the first element attributes 160a. In certain embodiments, the augmented reality message 164a may further include navigation and/or guidance messages and/or instructions. Examples of the augmented reality messages 164a are described further below in Table 1.

The navigation engine 144 may generate an augmented reality display 162 in which the augmented reality message 164a is presented as a virtual object. The navigation engine 144 may then anchor the augmented reality message 164a to the first element 126a (or to the location coordinates 166a of the first element 126a). By anchoring the augmented reality message 164a to the first element 126a (or to the location coordinates 166a of the first element 126a), as the user 102 who is wearing the augmented reality device 130 (e.g., glasses) moves their head), the augmented reality message 164a moves along in relation to the user head movements.

Thus, the augmented reality message 164a may be anchored to the location coordinate 166a such that in response to the head movements of the user 102 with respect to the first location coordinate 166a, the augmented reality message 164a moves in relation to the head movements of the user 102. In another example, as the location coordinate 166a of the element 126a changes as a result of the user 102 moving their head, scrolling up or down, etc., the augmented reality message 164a moves in relation to the changes in the location coordinate 166a. As a result, the augmented reality message 164a may appear to be tethered or anchored to the first element 126a on the augmented reality display 162. Thus, even if the user 102 scrolls up and down on the web application 124, the augmented reality message 164a moves along the scrolling up and down events, such that the augmented reality message 164a appears to be anchored to the first element 126a.

The navigation engine 144 may determine the one-to-one mapping between the pixels of the image 168a of the application 124 and corresponding location coordinates on the augmented frames 232.

The navigation engine 144 may employ the determined one-to-one mapping to present the augmented reality display 162 to the augmented reality device 130, such that the augmented reality display 162 is superimposed on the application 124 as the user 102 looks at the application 124 and sees the augmented reality display 162 superimposed on the application 124.

The navigation engine 144 may also synchronize each image frame 168 to its respective augmented frame 232. The image frames 168a, 168b, 168c, and 168n are captured at times, T1, T2, T3, and T3, respectively. The image frames 168a-n may include the images of the application 124 as seen by the user 102 wearing the augmented reality device 130. The image frames 168a-n may include objects in the physical environment 220.

The navigation engine 144 may generate augmented frames 232 in the augmented environment 230. The navigation engine 144 may render each augmented frame 232 based on the position (or updated position) of the augmented reality message 164a in each augmented frame 232. The stream of the augmented frames 232 may form an augmented image frame/video stream to be displayed on the augmented reality display 162. For example, the augmented reality display 162 may show the augmented image frame 232 streams or augmented video. The navigation engine 144 generates the augmented image frames 232a-n or augmented video.

The navigation engine 144 synchronizes each augmented frame 232 with its respective image frame 168. The augmented frame 232a is synchronized to image frame 168a, the augmented frame 232b is synchronized to image frame 168b, the augmented frame 232c is synchronized to image frame 168c, and the augmented frame 232n is synchronized to image frame 168n. The augmented frame 232a is to be displayed on the augmented reality display 162 at T1, the augmented frame 232b is to be displayed on the augmented reality display 162 at T2, the augmented frame 232c is to be displayed on the augmented reality display 162 at T3, and the augmented frame 232n is to be displayed on the augmented reality display 162 at Tn.

In certain embodiments, the navigation engine 144 may update the augmented reality display 162 to reflect the changes based on what element 126 the user 102 is looking at in real-time, near real-time, or within an acceptable latency (e.g., within one-millisecond delay, ten milliseconds delay, etc.).

The navigation engine 144 communicates the augmented reality display 162 to the augmented reality device 130 such that the augmented reality display 162 is superimposed on a field of view that shows the web application 124 as seen by the user 102 wearing the augmented reality device 130. In this manner, the user 102 can see the augmented reality message 164a on the augmented reality display 162. Thus, when the user 102 looks a the element 126a, the user 102 is informed about the purpose, function, how to use the element 126a, and other element attributes 160a of the element 126a by reading the augmented reality message 164a.

Determining Sensitivity Indicators of the Elements to which the User is Looking

In certain embodiments, the navigation engine 144 may determine sensitivity indicators 172 of the elements 126 to which the user 102 is looking. In certain embodiments, the sensitivity indicator 172 of an element 126 may indicate how long the user 102 is looking at the element 126. Thus, in certain embodiments, the sensitivity indicators 172 may be time-based. For example, if the user 102 looks at the element 126a for more than a threshold time period (e.g., more than two seconds, five seconds, or any other suitable time period), the navigation engine 144 may assign the sensitivity indicator 172 of the element 126a to high. In another example, if the user 102 looks at the element 126a for less than the threshold time period, the navigation engine 144 may assign the sensitivity indicator 172 of the element 126a to low.

In certain embodiments, the sensitivity indicator 172 of an element 126 may be related to or associated with a task 106 that the user 102 is performing on the web application 124. In an example scenario, assume that the user 102 wants to perform a particular task 106 on the web application 124. Also, assume that the user 102 is looking at the element 126a on the application 124.

The navigation engine 144 receives images 168 of the application 124 and eye tracking information 170, similar to that described above. The navigation engine 144 detects that the user 102 actuated the first element 126a based on one or more images 168 received from the augmented reality device 130. The navigation engine 144 may determine that the user 102 is performing a particular task 106 on the web application 124 based on the user activities on the web application 124. The user activates include the user 102 actuating or pressing the first element 126a. For example, the web application 124 may include a text that asks the user 102 for what purpose, the user 102 is visiting the web application 124. The first element 126 may include a link to a page or a button to start the task 106 that the user 102 wants to select. In this manner, the navigation engine 144 may determine the particular task 106 that the user 102 wants to perform on the web application 124. The navigation engine 144 may identify a first set of elements 126 that are known to be associated with the particular task 106. For example, if the particular task 106 is to open a new account, the first set of elements 126 may include text fields that the user 102 needs to fill out, and check marks that the user 102 needs to check, among others. The navigation engine 144 may assign sensitivity indicators 172 of the first set of elements 126 to high. The navigation engine 144 may identify a second set of elements 126 that are known to not be related to the particular task 106. In response, the navigation engine 144 may assign the sensitivity indicators 172 of the second set of elements 126 to be low.

In certain embodiments, if the sensitivity indicator 172 of an element 126 is high, the navigation engine 144 may indicate in the augmented reality message 164 for the element 126 that the sensitivity indicator 172 for this element 126 is high—meaning that this element 126 is related to the particular task 106 and the user 102 has to use it.

In certain embodiments, if the sensitivity indicator 172 of an element 126 is low, the navigation engine 144 may indicate in the augmented reality message 164 for the element 126 that the sensitivity indicator 172 for this element 126 is low—meaning that this element 126 is not related to the particular task 106.

In certain embodiments, if the sensitivity indicator 172 of an element 126 is high, the navigation engine 144 may display the augmented reality message 164 for the element 126.

In certain embodiments, if the sensitivity indicator 172 of an element 126 is low, the navigation engine 144 may instruct not to display the augmented reality message 164 for the element 126. For example, the navigation engine 144 may not generate or display the augmented reality message 164 for the element 126. This may indicate to the user 102 that the user 102 has to use the first set of elements 126 to perform the particular task 106.

In certain embodiments, the navigation engine 144 may instruct not to display a second augmented reality message 164 for the second element 126, if the second element 126 is not related to the particular task 106, even if it is determined that the user 102 is looking at the second element 126 (e.g., for more than the threshold time period).

In certain embodiments, the navigation engine 144 may generate and display an augmented reality message 164 for an element 126 that is known to be associated with the particular task 106 (that is determined that the user 102 wants to perform on the application 124), even if the user 102 is not looking at the element 126. For example, once the element 126 is shown in the foreground of the web application 124, it is determined that the user 102 wants to perform, and the element 126 is associated with the particular task 106, the navigation engine 144 may display an augmented reality display 162 on which the augmented reality message 164 for the element 126 is shown and transmit it to the augmented reality device 130. Thus, even if the user 102 is not looking at the element 126, they may see the augmented reality message 164 and proceed to actuate the element 126 to advance in performing the task 106. In this way, the user 102 may navigate through the application 124 more efficiently.

In certain embodiments, the navigation engine 144 may update the augmented reality display 162 to reflect the changes to what element 126 the user 102 is looking at real-time, near real-time, or within an acceptable latency (e.g., within one-millisecond delay, ten milliseconds delay, etc.).

Continuing the example above, the navigation engine 144 has determined that the user 102 is performing the particular task 106 on the web application 124, the second element 126 is known not to be associated with the particular task 106. The navigation engine 144 may determine that the user 102 is looking at the second element 126 based on the images 168 and eye tracking information 170. The navigation engine 144 may generate a second augmented reality message 164 that indicates the function, purpose, how to use, what to input, and other element attributes 160 of the second element 126. The second augmented reality message 164 may also include text that indicates the second element 126 is not associated with the particular task 106. The navigation engine 144 may update the augmented reality display 162 to show the second augmented reality message 164 that is anchored to the second element 126. The navigation engine 144 may communicate the augmented reality display 162 to the augmented reality device 130.

Example Operational Flow for Detecting Errors in a Web Application

Figure 3:
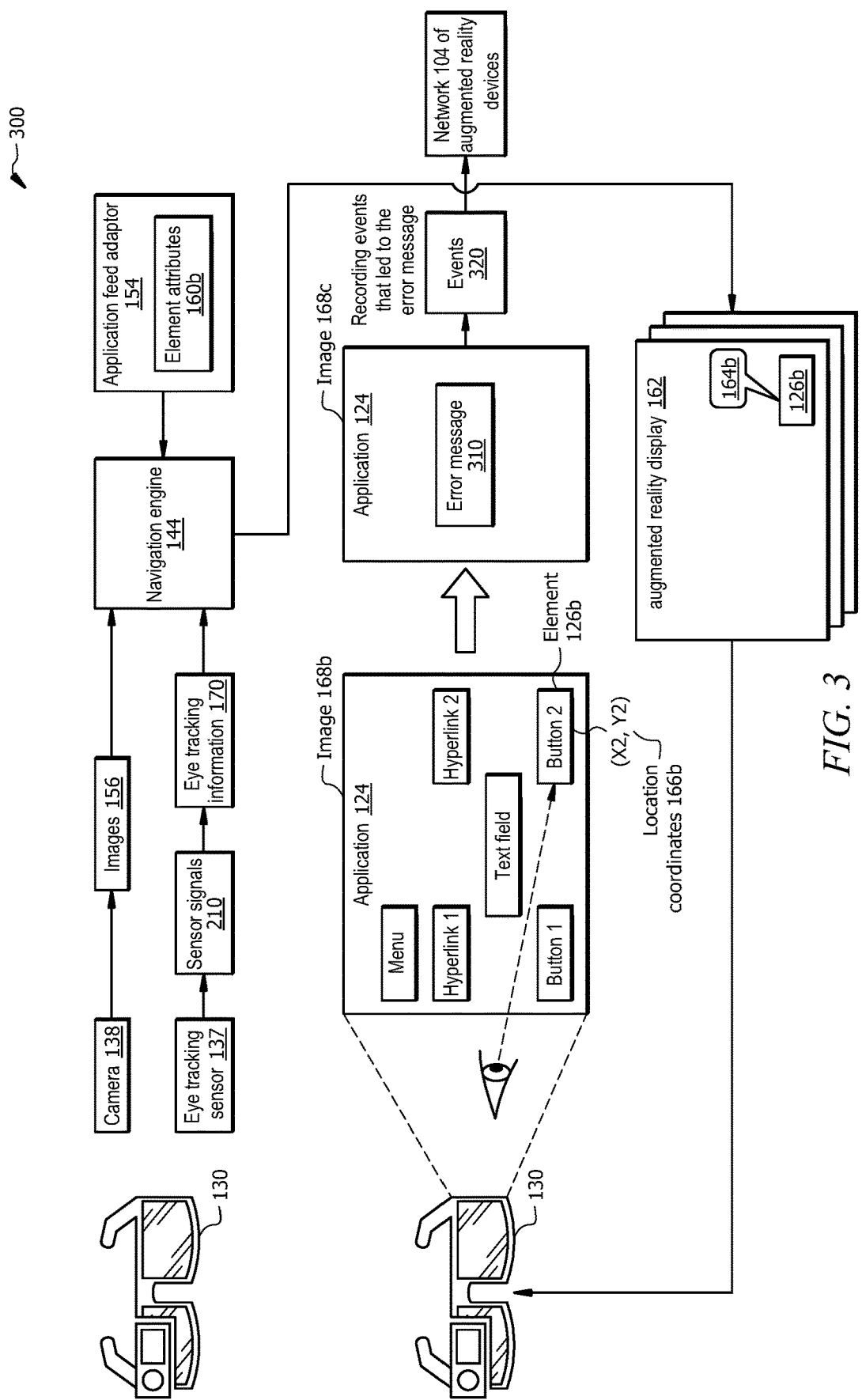
FIG. 3 illustrates an example operational flow of the system of FIG. 1 for detecting an error message on web application and updating navigation instructions based on the error message.

FIG. 3 illustrates an example operational flow 300 for detecting errors in a web application 124. In certain embodiments, the initial process of the operational flow 300 may be similar to the operational flow 200 described in FIG. 2, where the augmented reality device 130 is paired with the server 140. Once paired, the augmented reality device 130 transmits images 168 and eye tracking information 170 to the server 140.

The server 140 receives the images 168 and the eye tracking information 170 and forwards them to the navigation engine 144. In the particular example illustrated in FIG. 3, assume that the user 102 is looking at the second element 126b on the web application 124. The navigation engine 144 receives a second image 168b of the web application 124. The second image 168b shows the second element 126b. The navigation engine 144 determines the location coordinates 166b of the element 126b.

Similarly, the navigation engine 144 may determine the location coordinates 166 of other elements 126 presented on the web application 124. In this process, the navigation engine 144 may implement the machine learning module 152 to identify the elements 126 based on their shapes, colors, text, etc. The navigation engine 144 then determines the location coordinates 166 of each element 126 displayed on the image 168b.

The navigation engine 144 determines that the user 102 is looking at the second element 126b based on the image 168, location coordinate 166b, and the eye tracking information 170.

The navigation engine 144 then determines that the second element 126b is located at the second location coordinate 166b based on the information learned from the location coordinate 166b and eye tracking information 170.

The navigation engine 144 identifies the element attributes 160b that are associated with the second element 126b. In this process, the navigation engine 144 (e.g., via the application feed adaptor 154) searches in the mapping table 158 and determines that the element attributes 160b are associated with the second element 126b. The navigation engine 144 may generate the augmented reality message 164b that comprises the element attributes 160b and other information about the element 126b, similar to that described in FIGS. 1 and 2 with respect to generating the augmented reality message 164a. The navigation engine 144 may generate the augmented reality display 162 in which the augmented reality message 164b is anchored to the second element 126b (or its location coordinate 166b), similar to that described in FIGS. 1 and 2.

The navigation engine 144 may transmit the augmented reality display 162 to the augmented reality device 130. The augmented reality display 162 is displayed on the augmented reality device 130 (e.g., on the transparent covers similar to glasses). The user 102 who is wearing the augmented reality device 130 (on their face) sees the augmented reality message 164b displayed on the augmented reality display 162.

Assume that the user 102 presses on or actuates the element 126b, and the application 124 shows an error message 310. Throughout the processes described above, the navigation engine 144 may continuously (or periodically, every second, every millisecond, etc.) receive one or more images 168 from the augmented reality device 130. For example, assume that the navigation engine 144 receives the third image 168c of the web application 124 from the augmented reality device 130. The navigation engine 144 extracts features from the third image 168c by feeding the third image 168c to the machine learning module 152. The features may include shapes, sizes, colors, locations, and text of the elements 126 and other objects shown in the third image 168c. In this process, the navigation engine 144 determines that the third image 168c shows an error message 310.

Thus, the navigation engine 144 determines that the application 124 has failed (or shows the error message 310) in response to actuating or pressing the second element 126b. Accordingly, the navigation engine 144 detects that the third image 168c of the application 124 shows the error message 310 which is in response to actuating the second element 126b. In such cases, the navigation engine 144 may record the user events, web application events, user activities, network events, collectively referred to herein as events 320 that led to the error message 310. In case of network event 320, the network events 320 may include data communication that leads to loading the application 124 and network traffic that is the result of loading the application 124. In case of web application events 320, the web application events 320 may include running and implementation of code of the web application 124. In case of user activity events 320, the user activity events 320 may include the user actuating, pressing, clicking on an element 126, filling out text in a text box, attaching a file to a attachment box, etc. In some cases, the error message 310 may not be obvious in the image 168c. For example, the error message 310 may be or include a broken code line that is shown on the web application 124. In some cases, the error message 310 may be, include, or associated with an error that is due to a bug in the code of the web application 124 in the frontend and/or backend. In some cases, the error message 310 may not show up or popup on the application 124 at all, but the error message 310 may represent that the application 124 has not performed or opened an appropriate web page in response to the actuation of the second element 126b. Thus, the error message 310 may indicate that the second element 126b is faulty. In response to detecting the error message 310, the navigation engine 144 records the events 320, the second image 168b, and the third image 168c. The navigation engine 144 may package this information and data and send it to developers for troubleshooting the second element 126b.

In certain embodiments, the navigation engine 144 may update the augmented reality message 164b based on the events 320 and the error message 310. For example, the updated augmented reality message 164b for the faulty element 126b may include text that indicates the element 126b is faulty and suggest another element 126 and/or another route that directs the user 102 to an appropriate web page or to perform a task 106 that is determined the user 102 wants to perform.

The navigation engine 144 may transmit the updated augmented reality message 164b to one or more augmented reality devices 130 in the network 104, when it is determined the one or more respective users 102 are looking at the faulty element 126b from their respective augmented reality devices 130 on their respective computing devices 120.

Example Augmented Reality Messages

Example augmented reality messages 164 for different elements 126 are illustrated in Table 1. In the example of Table 1, augmented reality messages 164 for elements 126a and 126b. Table 1 also shows the location coordinates 166 of the elements 126a and 126b on the respective images 168. Table 1 also shows the location coordinates on the respective augmented reality frames 232. The examples of the augmented reality messages 164 and other information shown in Table 1 are for illustration purposes only and are not meant to limit the scope of the present disclosure. The elements 126a and 126b in Table 1 may or may not correspond to elements 126a and 126b described in FIGS. 2 and 3, respectively.

TABLE 1

Examples of the augmented reality messages 164.

| Time | Location coordinates on image 168 | Element 126 | Image frame 168 number | Element attributes 160 | Augmented reality message 164 | location coordinates on augmented frame 232 | Sensitivity indicator 172 |
|---|---|---|---|---|---|---|---|
| T1 | X1, Y1 | 126a | 1 | Phone number field | Enter 10-digit phone number | X1, Y1 | High |
| T2 | X1, Y3 | 126a | 1 | Phone number field | Enter 10-digit phone number | X1, Y3 | High |

TABLE 1-continued

Examples of the augmented reality messages 164.

| Time | Location coordinates on image 168 | Element 126 | Image frame 168 number | Element attributes 160 | Augmented reality message 164 | location coordinates on augmented frame 232 | Sensitivity indicator 172 |
|---|---|---|---|---|---|---|---|
| T3 | X1, Y4 | 126a | 2 | Phone number field | Enter 10-digit phone number | X1, Y4 | High |
| T4 | X3, Y7 | 126b | 2 | button to a contact page | Go to a contact page | X3, Y7 | Low |
| T5 | X4, Y8 | 126b | 3 | button to a contact page | Go to a contact page | X4, Y8 | Low |
| T6 | X4, Y9 | 126b | 3 | button to a contact page | Go to a contact page | X4, Y9 | Low |

As can be seen in the Table 1, in row 1, the navigation engine 144 determines the location coordinates 166 of the element 126a on the image frame 1 to be X1,Y1 at T1. The navigation engine 144 also determines the element attributes 160 of the element 126a includes "phone number field." The navigation engine 144 generates the augmented reality message 164 for element 126a to be "Enter 10-digit phone number." The navigation engine 144 may determine that the augmented reality message 164 should be anchored to the location coordinate X1,Y1 on the respective augmented frame 232. The navigation engine 144 also determines that the sensitivity indicator 172 of the element 126a is high, e.g., because the element 126a is associated with the task 106 that the user 102 is performing on the web application 124.

In row 2, the navigation engine 144 determines the location coordinates 166 of the element 126a on the image frame 1 to be X1,Y3 at T2. This may be because the user 102 has scrolled up or down on the web application 124, the user 102 is looking at different corners of the element 126a, or user 102 (wearing the augmented reality device 130) moved their head—leading to the change in the location coordinates. The navigation engine 144 also determines the element attributes 160 of the element 126a includes "phone number field." The navigation engine 144 generates the augmented reality message 164 for element 126a to be "Enter 10-digit phone number." The navigation engine 144 may determine that the augmented reality message 164 should be anchored to the location coordinate X1,Y3 on the respective augmented frame 232. The navigation engine 144 also determines that the sensitivity indicator 172 of the element 126a is high, e.g., because the element 126a is associated with the task 106 that the user 102 is performing on the web application 124.

In row 3, the navigation engine 144 determines the location coordinates 166 of the element 126a on the image frame 2 to be X1,Y4 at T3. This may be because the user 102 has scrolled up or down on the web application 124, the user 102 is looking at different corner of the element 126a, or user 102 (wearing the augmented reality device 130) moved their head—leading to the change in the location coordinates. The navigation engine 144 also determines the element attributes 160 of the element 126a includes "phone number field." The navigation engine 144 generates the augmented reality message 164 for element 126a to be "Enter 10-digit phone number." The navigation engine 144 may determine that the augmented reality message 164 should be anchored to the location coordinate X1,Y4 on the respective augmented frame 232. The navigation engine 144 also determines that the sensitivity indicator 172 of the element 126a is high, e.g., because the element 126a is associated with the task 106 that the user 102 is performing on the web application 124.

In row 4, the navigation engine 144 determines the location coordinates 166 of the element 126b on the image frame 2 to be X3,Y7 at T4. The navigation engine 144 also determines the element attributes 160 of the element 126b includes "button to a contact page." The navigation engine 144 generates the augmented reality message 164 for element 126b to be "Go to a contact page." The navigation engine 144 may determine that the augmented reality message 164 should be anchored to the location coordinate X3,Y7 on the respective augmented frame 232. The navigation engine 144 also determines that the sensitivity indicator 172 of the element 126b is low, e.g., because the element 126b is not associated with the task 106 that the user 102 is performing on the web application 124.

In row 5, the navigation engine 144 determines the location coordinates 166 of the element 126b on the image frame 3 to be X4,Y8 at T5. This may be because the user 102 has scrolled up or down on the web application 124, the user 102 is looking at different corners of the element 126b, or user 102 (wearing the augmented reality device 130) moved their head—leading to the change in the location coordinates. The navigation engine 144 also determines the element attributes 160 of the element 126b includes "button to a contact page." The navigation engine 144 generates the augmented reality message 164 for element 126b to be "Go to a contact page." The navigation engine 144 may determine that the augmented reality message 164 should be anchored to the location coordinate X4,Y8 on the respective augmented frame 232. The navigation engine 144 also determines that the sensitivity indicator 172 of the element 126b is low, e.g., because the element 126b is not associated with the task 106 that the user 102 is performing on the web application 124.

In row 6, the navigation engine 144 determines the location coordinates 166 of the element 126b on the image frame 3 to be X4,Y9 at T6. This may be because the user 102 has scrolled up or down on the web application 124, the user 102 is looking at different corners of the element 126b, or user 102 (wearing the augmented reality device 130) moved their head—leading to the change in the location coordinates. The navigation engine 144 also determines the element attributes 160 of the element 126b includes "button to a contact page." The navigation engine 144 generates the augmented reality message 164 for element 126*b* to be "Go to a contact page." The navigation engine 144 may determine that the augmented reality message 164 should be anchored to the location coordinate X4,Y9 on the respective augmented frame 232. The navigation engine 144 also determines that the sensitivity indicator 172 of the element 126*b* is low, e.g., because the element 126*b* is not associated with the task 106 that the user 102 is performing on the web application 124. In any of the augmented reality messages 164 in Table 1, the respective sensitivity indicator 172 may be included or indicated by text, a number out of a scale (e.g., 1 out of 10), etc.

Example Method for Navigating on an Augmented Reality Display

Figure 4:
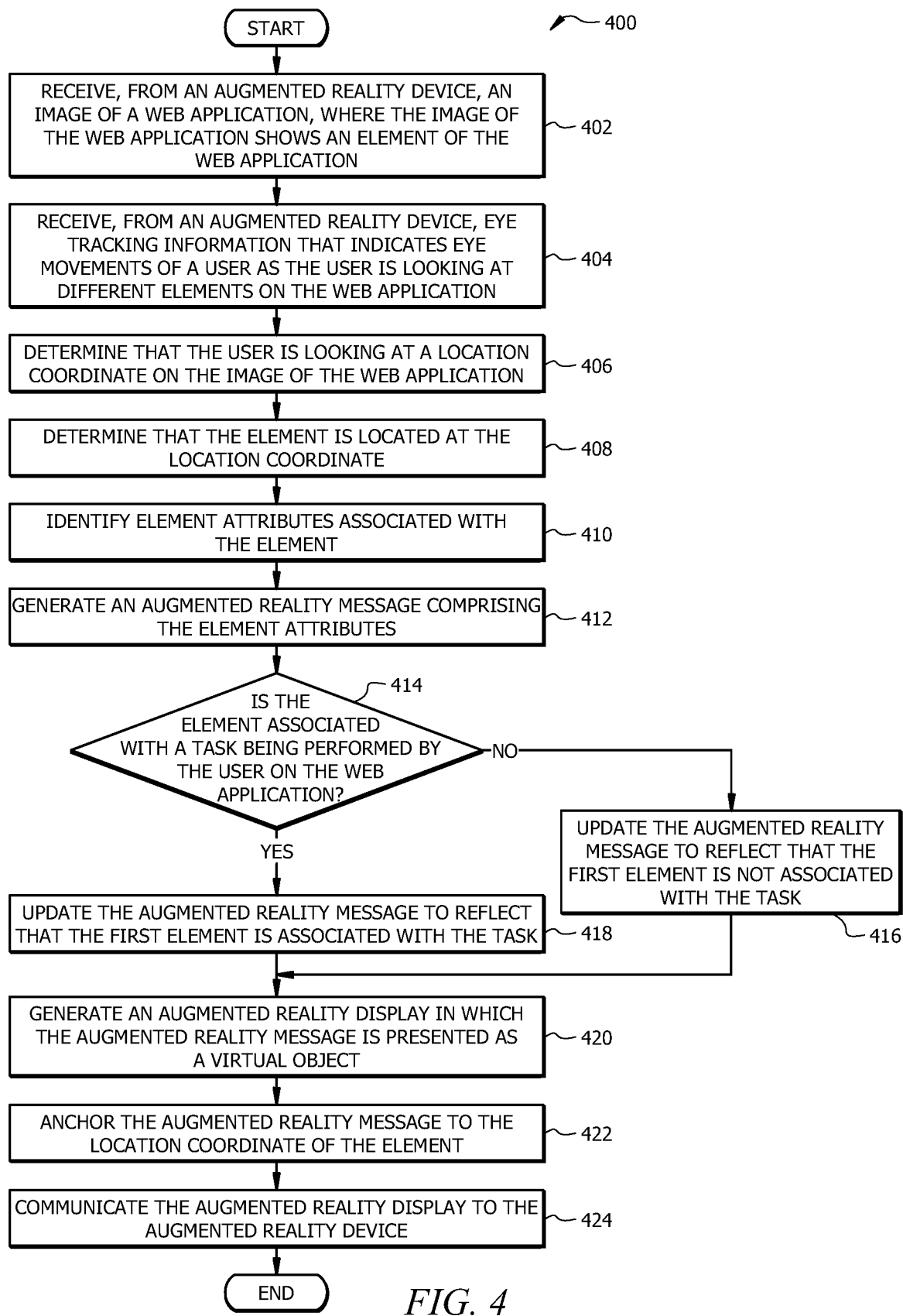
FIG. 4 illustrates an example flowchart of a method for navigating on an augmented reality display.

FIG. 4 illustrates an example flowchart of a method 400 for navigating on an augmented reality display 162. Modifications, additions, or omissions may be made to method 400. Method 400 may include more, fewer, or other operations. For example, operations may be performed in parallel or in any suitable order. While at times discussed as the system 100, server 140, augmented reality device 130, or components of any of thereof performing operations, any suitable system or components of the system may perform one or more operations of the method 400. For example, one or more operations of method 400 may be implemented, at least in part, in the form of software instructions 150 of FIG. 1, stored on non-transitory, tangible, machine-readable media (e.g., memories 148 of FIG. 1) that when run by one or more processors (e.g., processors 142 of FIG. 1) may cause the one or more processors to perform operations 402-420.

At 402, the navigation engine 144 receives, from the augmented reality device 130, an image 168 of the web application 124, where the image 168 of the web application 124 shows an element 126 of the web application 124. For example, the image 168 may show the field of view in front of the augmented reality device 130. The image 168 may include a background area (e.g., at least a portion of a desk, a table, a keyboard, a monitor, etc.) and the web application 124 that is displayed on the display screen of the computing device 120. The navigation engine 144 receives the image 168 when the augmented reality device 130 is paired with the server 140, similar to that described in FIGS. 1-3.

At 404, the navigation engine 144 receives, from the augmented reality device 130, eye tracking information 170 that indicates eye movements of the user 102 as the user 102 is looking at different elements 126 on the web application 124. Details of the eye tracking information 170 are described in FIGS. 1-3.

At 406, the navigation engine 144 determines that the user 102 is looking at a location coordinate 166 on the image 168 of the web application 124, based on the eye tracking information 170, similar to that described in FIGS. 1-3.

At 408, the navigation engine 144 determines that the element 126 is located on the location coordinate 166, similar to that described in FIGS. 1-3.

At 410, the navigation engine 144 identifies element attributes 160 that are associated with the element 126. In this process, the navigation engine 144 may search the mapping table 158 and determine the element attributes 160 that are associated with the element 126, similar to that described in FIGS. 1-3.

At 412, the navigation engine 144 generates an augmented reality message 164 comprising the element attributes 160, similar to that described in FIGS. 1-3. The augmented reality message 164 may include text description of the element 126, how to use it, its acceptable input, its purpose, context, what happens if it is actuated, and other element attributes 160 of the element 126.

At 414, the navigation engine 144 determines whether the element 126 is associated with a task 106 being performed by the user 102 on the web application 124. For example, the navigation engine 144 determines the task 106 that the user 102 is performing on the web application 124 and determines whether the element 126 is known to be associated with the task 106, similar to that described in FIGS. 1-3. If it is determined that the element 126 is not associated with the task 106, method 400 proceeds to 416. Otherwise, method 400 proceeds to 418.

At 416, the navigation engine 144 updates the augmented reality message 164 to reflect that the element 126 is not associated with the task 106. For example, the navigation engine 144 may add text that indicates the element 126 is not associated with the task 106. In another example, the navigation engine 144 may include a sensitivity indicator 172 of low in the augmented reality message 164.

At 418, the navigation engine 144 updates the augmented reality message 164 to reflect that the element 126 is associated with the task 106. For example, the navigation engine 144 may add text that indicates the element 126 is associated with the task 106. In another example, the navigation engine 144 may include a sensitivity indicator 172 of high in the augmented reality message 164.

At 420, the navigation engine 144 generates an augmented reality display 162 in which the augmented reality message 164 is presented as a virtual object, similar to that described in FIGS. 1-3. The stream of rendered augmented frames 232 forms the augmented reality display 162.

At 422, the navigation engine 144 anchors the augmented reality message 164 to the location coordinate 166 of the element 126. In another embodiment, the navigation engine 144 may anchor the augmented reality message 164 to the element 126.

At 424, the navigation engine 144 communicates the augmented reality display 162 to the augmented reality device 130. The augmented reality display 162 is displayed from transparent covers of the augmented reality device 130 (e.g., similar to glasses) and superimposed on a field of view that shows the web application 124 as seen by the user 102 wearing the augmented reality device 130.

Figure 5:
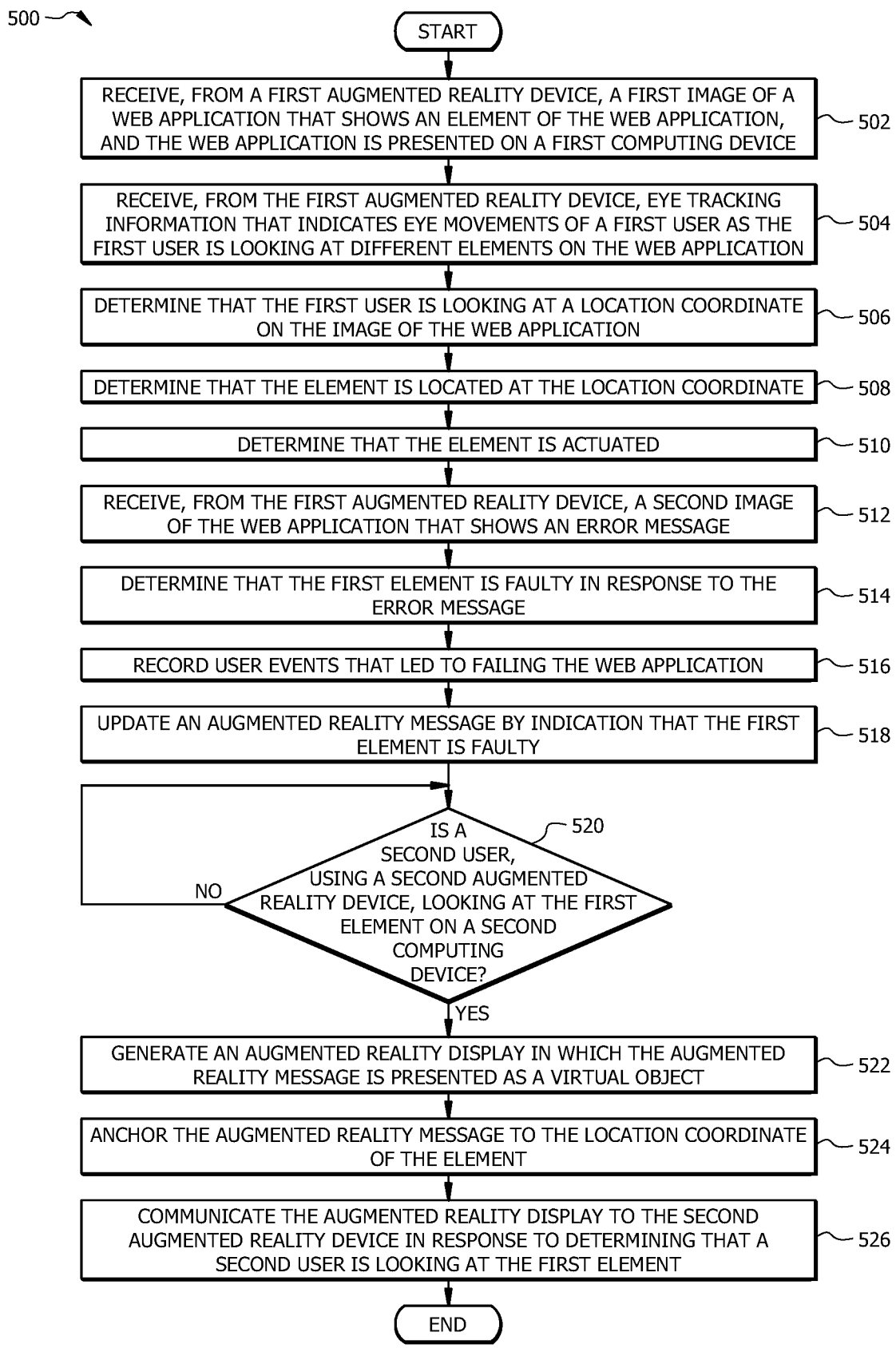
FIG. 5 illustrates an example flowchart of a method for updating augmented reality navigation instructions based on a detected error.

Example Method for Updating Augmented Reality Navigation Instructions Based on a Detected Error FIG. 5 illustrates an example flowchart of a method 500 for updating augmented reality navigation instructions based on a detected error. Modifications, additions, or omissions may be made to method 500. Method 500 may include more, fewer, or other operations. For example, operations may be performed in parallel or in any suitable order. While at times discussed as the system 100, server 140, augmented reality device 130, or components of any of thereof performing operations, any suitable system or components of the system may perform one or more operations of the method 500. For example, one or more operations of method 500 may be implemented, at least in part, in the form of software instructions 150 of FIG. 1, stored on non-transitory, tangible, machine-readable media (e.g., memories 148 of FIG. 1) that when run by one or more processors (e.g., processors 142 of FIG. 1) may cause the one or more processors to perform operations 502-526.

At 502, the navigation engine 144 receives, from a first augmented reality device 130, a first image 168 of a web application 124 that shows an element 126 of the web application 124, and the web application 124 is presented on a first computing device 120. For example, the navigation engine 144 may receive the first image 168 similar to that described in FIGS. 1-3.

At 504, the navigation engine 144 receives, from the first augmented reality device 130, eye tracking information 170 that indicates eye movements of a first user 102 as the first user is looking at different elements 126 on the web application 124. For example, the navigation engine 144 may receive the eye tracking information 170, similar to that described in FIGS. 1-3.

At 506, the navigation engine 144 determines that the first user 102 is looking that a location coordinate 166 on the image 168 of the web application 124. For example, the navigation engine 144 may determine that the first user 102 is looking at a location coordinate 166 based on eye tracking information 170, similar to that described in FIGS. 1-3.

At 508, the navigation engine 144 determines that the element 126 is located at the location coordinate 166, similar to that described in FIGS. 1-3.

At 510, the navigation engine 144 determines that the element 126 is actuated. For example, the navigation engine 144 may determine that the first user 102 has clicked or pressed on the element 126 based on images 168 of the web application 124.

At 512, the navigation engine 144 receives, from the first augmented reality device 130, a second image 168 of the web application 124 that shows an error message 310. Examples of the error message 310 are described in FIG. 3. The error message 310 may indicate that the web application 124 has failed. For example, the error message 310 may include an error message on a web page that is not loaded (e.g., 404 http error message/page).

At 514, the navigation engine 144 determines that the first element 126 is faulty in response to the error message 310.

At 516, the navigation engine 144 records user events 320 that led to failing the web application 124. The user events 320 include actuating the first element 126 and any other event that led to failing the web application 124.

At 518, the navigation engine 144 updates an augmented reality message 164 for the first element 126 by indicating that the first element 126 is faulty. Examples of updating the augmented reality message 164 in case of the error message 310 are described in FIG. 3.

At 520, the navigation engine 144 determines whether a second user 102, using a second augmented reality device 130, is looking at the first element 126 on a second computing device 120. The second augmented reality device 130 may be any of the network 104 of augmented reality devices. The first augmented reality device 130 may be any of the network 104 of augmented reality devices. The first augmented reality device 130 is different from the second augmented reality device 130. The first computing device 120 is different than the second computing device 120. For example, the navigation engine 144 may determine whether the second user 102 is looking at the first element 126, based on images 168 of the web application 124 presented on the second computing device 120 and eye tracking information 170 associated with the second user 102, similar to that described in FIG. 3. If the navigation engine 144 determines that the second user 102 is looking at the first element 126, method 500 proceeds to 522. Otherwise, method 500 remains at 520.

At 522, the navigation engine 144 generates an augmented reality display 162 in which the augmented reality message 164 is presented as a virtual object, similar to that described in FIGS. 1-3. The stream of rendered augmented frames 232 forms the augmented reality display 162.

At 524, the navigation engine 144 anchors the augmented reality message 164 to the location coordinate 166 of the element 126. In another embodiment, the navigation engine 144 may anchor the augmented reality message 164 to the element 126.

At 526, the navigation engine 144 communicates the augmented reality display 162 to the second augmented reality device 130. The augmented reality display 162 is displayed from transparent covers of the second augmented reality device 130 (e.g., similar to glasses) and superimposed on a field of view that shows the web application 124 as seen by the second user 102 wearing the second augmented reality device 130. In certain embodiments, the navigation engine 144 may perform a similar operation (e.g., 522-526) if the first user 102 looks at the first element 126 that is faulty.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system for navigating on an augmented reality display, comprising:
   a memory configured to store:
      a mapping table comprising a mapping between each of a plurality of elements of a web application and a respective element attribute, such that:
         a first element from among the plurality of elements is mapped to a first element attribute; and
         a second element from among the plurality of elements is mapped to a second element attribute;
   a processor, operably coupled to the memory, and configured to:
      receive, from an augmented reality device, a first image of the web application that shows the first element;
      receive, from the augmented reality device, eye tracking information that indicates eye movements of a user as the user is looking at different elements on the web application;
      determine, based at least in part upon the eye tracking information, that the user is looking at a first location coordinate on the first image of the web application;

determine a location of the first element associated with the first location coordinate;
identify the first element attribute that is associated with the first element;
generate an augmented reality message comprising the first element attribute;
generate an augmented reality display in which the augmented reality message is presented as a virtual object;
anchor the augmented reality message to the first location coordinate on the augmented reality display; and
communicate the augmented reality display to the augmented reality device, such that the augmented reality display is superimposed on a field of view that shows the web application as seen by the user using the augmented reality device.

2. The system of claim 1, further comprising the augmented reality device that comprises:
a camera configured to capture images of the field of view in front of the augmented reality device; and
an eye tracking sensor configured to:
track eye movements of the user as the user is looking at different elements of the web application; and
generate sensor signals based at least in part upon the eye movements of the user; and
a second processor, operably coupled to the camera and the eye tracking sensor, and configured to:
receive the sensor signals and the images;
determine the eye tracking information based at least in part upon the sensor signals, wherein:
the eye tracking information indicates a gaze point on which eyes of the user are focused; and
the eye tracking information is determined by:
emitting invisible light onto the eyes of the user;
receiving reflected light bounced off from the eyes;
determining, based at least in part upon the emitted light and the reflected light, a direction to which the eyes are looking; and
determining the gaze point to which of the eyes are focused based at least in part upon the determined direction; and
communicate the images and the eye tracking information to the processor.

3. The system of claim 1, wherein the processor is further configured to:
receive, from the augmented reality device, a second image of the web application, wherein the second image shows the second element;
determine, based at least in part upon the eye tracking information, that the user is looking at a second location coordinate on the second image of the web application;
determine a location of the second element associated with the second location coordinate;
identify the second element attribute that is associated with the second element;
detect an error message when the second element is actuated, wherein detecting the error message comprises:
receiving a third image of the web application;
detecting that the third image of the web application shows an error web page that is in response to the actuation of the second element;
record the second image, the third image, and events that led to the error message, wherein the events comprise the user actuating the second element; and
communicate the second image, the third image, and the events for troubleshooting the second element.

4. The system of claim 1, wherein the augmented reality message is anchored to the first location coordinate such that in response to head movements of the user wearing the augmented reality device with respect to the first location coordinate, the augmented reality message moves in relation to the head movements of the user.

5. The system of claim 1, wherein the processor is further configured to:
detect that the user actuated the first element based at least in part upon one or more images of the web application;
determine that the user is performing a particular task on the web application based at least in part upon user activities on the web application, wherein the user activities comprise the user actuating the first element;
identify a first set of elements of the web application that are known to be associated with the particular task;
assign a first set of sensitivity indicators associated with the first set of elements to high;
determine that the second element is known to not be associated with the particular task; and
assign a second sensitivity indicator associated with the second element to low.

6. The system of claim 5, wherein the processor is further configured to instruct to not display a second augmented reality message for the second element, even if it is determined that the user is looking at the second element.

7. The system of claim 5, wherein the processor is further configured to:
determine that the user is looking at the second element;
generate a second augmented reality message that indicates that the second element is not associated with the particular task;
update the augmented reality display to show the second augmented reality message anchored to the second element; and
communicate the augmented reality display to the augmented reality device.

8. A method for navigating on an augmented reality display, comprising:
accessing, from an augmented reality device, a first image of a web application, wherein:
the first image of the web application shows a first element from among a plurality of elements;
accessing a mapping table comprising a mapping between each of the plurality of elements and a respective element attribute, such that:
the first element from among the plurality of elements is mapped to a first element attribute; and
a second element from among the plurality of elements is mapped to a second element attribute;
receiving, from the augmented reality device, eye tracking information that indicates eye movements of a user as the user is looking at different elements on the web application;
determining, based at least in part upon the eye tracking information, that the user is looking at a first location coordinate on the first image of the web application;
determining a location of the first element associated with the first location coordinate;
identifying a first element attribute that is associated with the first element;
generating an augmented reality message comprising the first element attribute;

generating an augmented reality display in which the augmented reality message is presented as a virtual object;

anchoring the augmented reality message to the first location coordinate on the augmented reality display; and communicating the augmented reality display to the augmented reality device, such that the augmented reality display is superimposed on a field of view that shows the web application as seen by the user using the augmented reality device.

9. The method of claim 8, further comprising:

capturing, by a camera associated with the augmented reality device, images of the field of view in front of the augmented reality device;

tracking, by an eye tracking sensor associated with the augmented reality device, eye movements of the user as the user is looking at different elements of the web application; and generating, by the eye tracking sensor, sensor signals based at least in part upon the eye movements of the user; and receiving, by a processor associated with the augmented reality device, the sensor signals and the images;

determining, by the processor, the eye tracking information based at least in part upon the sensor signals, wherein:
the eye tracking information indicates a gaze point on which eyes of the user are focused; and
the eye tracking information is determined by:
emitting invisible light onto the eyes of the user;
receiving reflected light bounced off from the eyes;
determining, based at least in part upon the emitted light and the reflected light, a direction to which the eyes are looking; and
determining the gaze point to which of the eyes are focused based at least in part upon the determined direction; and communicating, by the processor, the images and the eye tracking information.

10. The method of claim 8, wherein:
the first element attribute further comprises a first input data format that is accepted by the first element; and
the second element attribute further comprises a second input data format that is accepted by the second element.

11. The method of claim 8, wherein the augmented reality message is anchored to the first location coordinate such that in response to head movements of the user wearing the augmented reality device with respect to the first location coordinate, the augmented reality message moves in relation to the head movements of the user.

12. The method of claim 8, further comprising:
detecting that the user actuated the first element based at least in part upon one or more images of the web application;
determining that the user is performing a particular task on the web application based at least in part upon user activities on the web application, wherein the user activities comprise the user actuating the first element;
identifying a first set of elements of the web application that are known to be associated with the particular task;
assigning a first set of sensitivity indicators associated with the first set of elements to high;
determining that the second element is known to not be associated with the particular task; and
assigning a second sensitivity indicator associated with the second element to low.

13. The method of claim 12, further comprising instructing to not display a second augmented reality message for the second element, even if it is determined that the user is looking at the second element.

14. The method of claim 12, further comprising:
determining that the user is looking at the second element;
generating a second augmented reality message that indicates that the second element is not associated with the particular task;
updating the augmented reality display to show the second augmented reality message anchored to the second element; and
communicating the augmented reality display to the augmented reality device.

15. A non-transitory computer-readable medium storing instructions that when executed by a processor cause the processor to:
receive, from an augmented reality device, a first image of a web application, wherein the first image of the web application shows a first element from among the plurality of elements,
access a mapping table comprising a mapping between each of the plurality of elements and a respective element attribute, such that:
the first element from among the plurality of elements is mapped to a first element attribute; and
a second element from among the plurality of elements is mapped to a second element attribute;
receive, from the augmented reality device, eye tracking information that indicates eye movements of a user as the user is looking at different elements on the web application;
determine, based at least in part upon the eye tracking information, that the user is looking at a first location coordinate on the first image of the web application;
determine a location of the first element associated with the first location coordinate;
identify a first element attribute that is associated with the first element;
generate an augmented reality message comprising the first element attribute;
generate an augmented reality display in which the augmented reality message is presented as a virtual object;
anchor the augmented reality message to the first location coordinate on the augmented reality display; and
communicate the augmented reality display to the augmented reality device, such that the augmented reality display is superimposed on a field of view that shows the web application as seen by the user using the augmented reality device.

16. The non-transitory computer-readable medium of claim 15, wherein the augmented reality device comprises:
a camera configured to capture images of the field of view in front of the augmented reality device; and
an eye tracking sensor configured to:
track eye movements of the user as the user is looking at different elements of the web application; and
generate sensor signals based at least in part upon the eye movements of the user; and
a second processor, operably coupled to the camera and the eye tracking sensor, and configured to:
receive the sensor signals and the images;
determine the eye tracking information based at least in part upon the sensor signals, wherein:

the eye tracking information indicates a gaze point on which eyes of the user are focused; and the eye tracking information is determined by:
- emitting invisible light onto the eyes of the user;
- receiving reflected light bounced off from the eyes;
- determining, based at least in part upon the emitted light and the reflected light, a direction to which the eyes are looking; and
- determining the gaze point to which of the eyes are focused based at least in part upon the determined direction; and communicate the images and the eye tracking information to the processor.

17. The non-transitory computer-readable medium of claim 15, wherein the instructions further cause the processor to:
- receive, from the augmented reality device, a second image of the web application, wherein the second image shows a second element;
- determine, based at least in part upon the eye tracking information, that the user is looking at a second location coordinate on the second image of the web application;
- determine a location of the second element associated with the second location coordinate;
- identify a second element attribute that is associated with the second element;
- detect an error message when the second element is actuated, wherein detecting the error message comprises:
  - receiving a third image of the web application;
  - detecting that the third image of the web application shows an error web page that is in response to the actuation of the second element;
- record the second image, the third image, and events that led to the error message, wherein the events comprise the user actuating the second element; and
- communicate the second image, the third image, and the events for troubleshooting the second element.

18. The non-transitory computer-readable medium of claim 15, wherein the augmented reality message is anchored to the first location coordinate such that in response to head movements of the user wearing the augmented reality device with respect to the first location coordinate, the augmented reality message moves in relation to the head movements of the user.

19. The non-transitory computer-readable medium of claim 15, wherein:
- the first element attribute further comprises a first input data format that is accepted by the first element; and
- the second element attribute further comprises a second input data format that is accepted by the second element.

20. The non-transitory computer-readable medium of claim 15, wherein the instructions further cause the processor to:
- determine that the user is looking at the first element for more than a threshold time period;
- in response to determining that the user is looking at the first element for more than the threshold time period, assign a first sensitivity indicator associated with the first element to high;
- determine that the user is looking at the second element for less than the threshold time period; and
- in response to determining that the user is looking at the second element for less than the threshold time period, assign a second sensitivity indicator associated with the second element to low.

* * * * *